(12) United States Patent
Bolgar

(10) Patent No.: US 8,864,406 B2
(45) Date of Patent: Oct. 21, 2014

(54) SPLINED COUPLINGS

(75) Inventor: Crispin D Bolgar, Nottingham (GB)

(73) Assignee: Rolls-Royce PLC, London (GB)

( * ) Notice: Subject to any disclaimer, the term of this patent is extended or adjusted under 35 U.S.C. 154(b) by 377 days.

(21) Appl. No.: 12/588,116

(22) Filed: Oct. 5, 2009

(65) Prior Publication Data

US 2010/0087263 A1    Apr. 8, 2010

(30) Foreign Application Priority Data

Oct. 7, 2008 (GB) .................................. 0818249.5

(51) Int. Cl.
*F16D 1/00* (2006.01)
*F16D 1/108* (2006.01)
*F16D 1/10* (2006.01)

(52) U.S. Cl.
CPC .......... *F16D 1/108* (2013.01); *F16D 2001/103* (2013.01)
USPC ...................... 403/359.1; 403/298; 403/359.6

(58) Field of Classification Search
USPC ............ 403/298, 359.1–359.6, 314; 464/162, 464/182, 158; 3/298, 359.1–359.6
See application file for complete search history.

(56) References Cited

U.S. PATENT DOCUMENTS

| | | | |
|---|---|---|---|
| 4,292,001 A | 9/1981 | Snell | |
| 4,395,247 A | 7/1983 | Roberts | |
| 5,046,596 A | 9/1991 | Dennert | |
| 5,580,183 A | * | 12/1996 | Brackoneski et al. ..... 403/359.1 |
| 5,779,551 A | * | 7/1998 | Stall et al. .................. 403/359.6 |

FOREIGN PATENT DOCUMENTS

| | | |
|---|---|---|
| GB | 957595 | 5/1964 |
| GB | 1132649 | 11/1968 |
| GB | 2 030 269 A | 4/1980 |
| GB | 2 309 504 A | 7/1997 |

OTHER PUBLICATIONS

Feb. 1, 2010 combined search report and Office Action issued in British Patent Application No. GB0915749.6.
British Search Report issued in British Patent Application No. GB0818249.5 on Jan. 29, 2009.

* cited by examiner

*Primary Examiner* — Daniel P Stodola
*Assistant Examiner* — Matthew R McMahon
(74) *Attorney, Agent, or Firm* — Oliff PLC

(57) ABSTRACT

Apparatus is provided comprising first and second coaxial shafts, the first and second shafts extending along, and being rotatable about, a central axis. The first and second shafts are coupled together by a splined major coupling at a coupling region of the apparatus, which major coupling enables the shafts to co-rotate about the central axis. A torque element is connected to the first and second shafts, the torque element being operable to force the first and second shafts to relatively rotate about the central axis in order to apply a preload to the major coupling. The apparatus may be comprised in a gas turbine engine, whereupon the first shaft may be a fan shaft and the second shaft may be a LP turbine shaft.

16 Claims, 4 Drawing Sheets

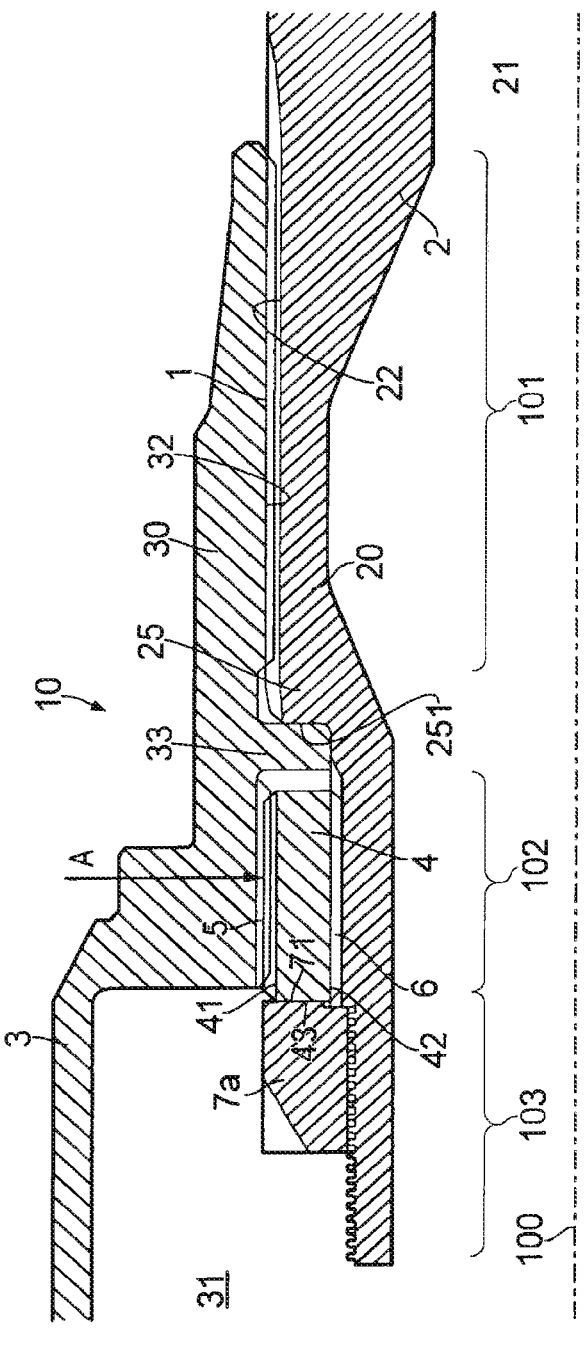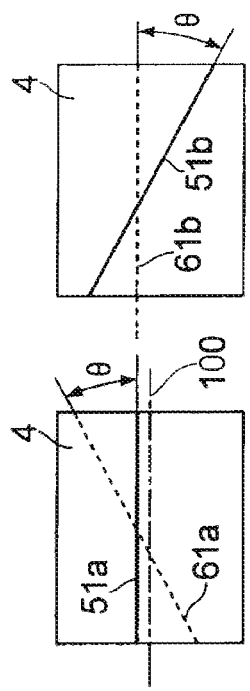

SPLINED COUPLINGS

The present invention relates to splined couplings, in particular, although not necessarily exclusively, splined couplings in gas turbine engines.

Splined couplings are routinely used to transmit torque between coaxial shafts in a variety of industrial applications. For example, in gas turbine engines, a splined coupling is provided between the low pressure (LP) turbine shaft and the fan shaft to transmit torque between the turbines and the compressors/fan. The splined coupling enables the shafts to co-rotate.

Splined couplings are often subject to a high degree of stress and are therefore features likely to limit the working lifetime of coupled shafts. To increase lifetime, it is known to increase the strength of the shafts and splined coupling. One way to increase strength is to increase the size of these components. However, as a result, the minimum achievable size of the coupled shafts can be significantly limited. In a gas turbine engine, the diameter of the LP turbine shaft is important as it can determine the minimum diameter of other components of the engine, such as the intermediate pressure (IP) turbine shaft (in 3-shaft applications), fan shaft, compressor bores, bearings and gears.

When a specific minimum diameter is an absolute requirement, it is known to alter the materials of the shafts and/or splined coupling to increase strength. However, such 'more capable' materials can be prohibitively expensive.

At its most general, the present invention provides apparatus comprising two shafts coupled together by a splined coupling so that the two shafts can co-rotate, and a means to preload the splined coupling to reduce the stress range on the coupling during rotation of the shafts in normal use. The apparatus may be comprised in, for example, a gas turbine engine, where the two shafts may be an LP turbine shaft and a fan shaft.

According to a first aspect of the present invention, there is provided first and second coaxial shafts, the first and second shafts extending along, and being rotatable about, a central axis, the first and second shafts being coupled together by a splined major coupling at a coupling region of the apparatus, the major coupling enabling the shafts to co-rotate about the central axis, a torque element connected to the first and second shafts via two splined minor couplings, the torque element being operable to force the first and second shafts to relatively rotate about the central axis in order to apply a preload to the major coupling, wherein the two splined minor couplings are angled relative to one another.

Preferably, the splined major coupling comprises a helical angle about the shafts and the angle between two splined minor couplings is less than the helical angle.

By preloading the splined coupling, the stress range on the splined coupling during use may be lower, increasing the lifetime of the apparatus. To achieve a lower stress range, the preloading causes the minimum stress on the spline to be higher such that, when a maximum stress is applied to the splined coupling, the overall stress range experienced by the splined coupling is reduced.

Preferably, the preload is applied in the same direction as the load (force) applied to the coupling during normal use, i.e. normal co-rotation of the shafts, although the preload is of a lower magnitude. By pre-loading the splined coupling, the force on the coupling prior to the initiation of co-rotation may be higher meaning that, upon initiation of the co-rotation, a lower stress range is experienced by the components. If the apparatus is employed in an engine, e.g. a gas turbine engine, initiation of co-rotation of the first and second shafts may occur on engine start-up.

By applying the preload, for shafts having a given outer diameter, material and maximum operating torque, an increase in life may be obtained. Accordingly, the size of the splined coupling may be reduced, reducing the size of the apparatus, and/or 'less capable' material may be used, reducing manufacturing costs.

Preferably, the torque element is configured to force relative rotation of the shafts upon moving in a direction parallel to the central axis of the torque element (referred to hereinafter as the "axial direction"). To achieve this, the torque element may be further configured to rotate about the central axis as it moves in the axial direction. The torque element may be substantially annular, with inner and outer sides/surfaces, and may be rotatable about one of the shafts.

Preferably, at the coupling region, the first shaft has a central bore providing an opening that receives the second shaft, an outer surface of the second shaft being adjacent an inner surface of the first shaft. The splined coupling may be provided between a portion of the outer surface of the second shaft and the inner surface of the first shaft. The torque element may be provided between another portion of the outer surface of the second shaft and the inner surface of the first shaft.

Preferably the torque element is coupled on one side to one of the first and second shafts via a helical splined coupling, the splines of the helical splined coupling being arranged to twist about the central axis; and the torque element is coupled on the other side to the other of the first and second shafts via a straight-cut splined minor coupling, the splines of the straight-cut splined coupling extending substantially parallel to the central axis (or at least more parallel to the central axis than the helical splined coupling). The helical splined coupling and the straight-cut splined coupling are referred to hereinafter as "minor" couplings, to distinguish them from the splined coupling between the first and second shafts, which is referred to hereinafter as a "major" coupling. If a force is applied to the torque element in the axial direction, the torque element is guided in the axial direction along the splines of the minor couplings. However, due to the difference in orientation of the splines of the minor couplings, the torque element will rotate about the central axis, forcing the first and second shafts coupled either side to relatively rotate, resulting in the preload being applied to the major coupling.

Preferably the apparatus comprises a nut, e.g. a ring nut, engaged to the torque element, the nut being operable to move the torque element in the axial direction. The nut may be annular. Preferably, the nut is arranged to rotate about a screw-thread that twists about the central axis. The angle of the screw-thread may be adjusted to allow more precise control and/or achieve greater mechanical advantage when moving the nut, and thus the torque element, in the axial direction. The screw-thread may be provided on one of the first and second shafts.

Upon exercising sufficient movement of the torque element to preload the splined coupling, the nut may remain in a fixed position on the screw-thread, maintaining the preload. Additionally or alternatively, the apparatus may comprise a chocking pad or spring element, for holding the ring nut and torque element in a position to maintain the required preload. This may be particularly useful to control the preload during a range of conditions and prevent vibration of the apparatus.

However, for increased strength, e.g. if the strength of the screw-thread proves inadequate, a collar fastener may be provided instead of the ring nut. The collar fastener may be operable to move the torque element, and may be fixable to one or both of the shafts, e.g. using bolts.

The major coupling may be a helical splined coupling. Preferably the helix angle of the helical splined minor coupling is less (e.g. one quarter) of the helix angle of the helical splined major coupling. Accordingly, preloading of the major coupling can be achieved in a controlled manner. Furthermore, by providing the two helical splined couplings, assembly of the apparatus may be easier.

Preferably, the apparatus is comprised in a gas turbine engine. The first shaft and the second shaft may be the fan shaft and the LP turbine shaft. Nevertheless, it is considered that the apparatus could be used in a variety of different applications where the life of a splined coupled shaft arrangement and/or the size or material of the arrangement is an issue. Applications may be in the aerospace, marine, industrial and automotive fields, for example.

In another aspect of the present invention there is provided a method of assembling first and second coaxial shafts, the first and second shafts extending along, and being rotatable about, a central axis, the first and second shafts being coupled together by a splined major coupling at a coupling region of the apparatus, the major coupling enabling the shafts to co-rotate about the central axis, a torque element connected to the first and second shafts, the torque element being operable to force the first and second shafts to relatively rotate about the central axis in order to apply a preload to the major coupling, each shaft having opposing abutment features defining a pre-determined axial position between shafts;

the method comprises the steps of
a) rotating the torque element to relatively rotate the two shafts until the abutment features abut and
b) further rotating the torque element to a pre-determined torque to introduce a pre-load into the splined major coupling.

Embodiments of the invention will now be described by way of example with reference to the accompanying drawings in which:

FIG., 1A shows a cross-sectional view on B-B in FIG. 2 of the apparatus;

FIGS. 1B and 1C show schematic views of the splines of the spline coupling in 1A in the direction of arrow A.

Figure 3:
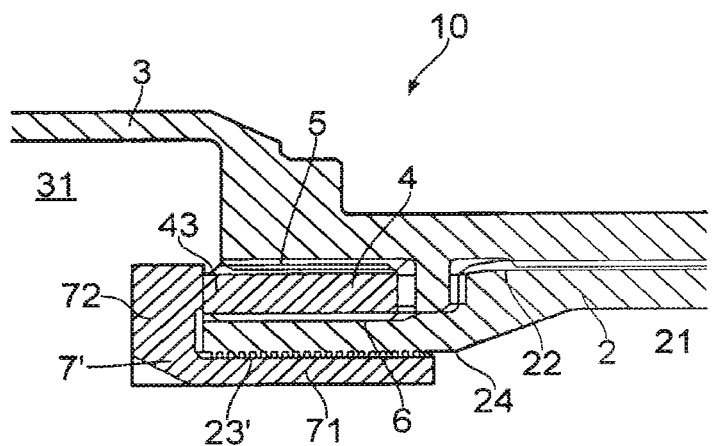
FIG. 3 shows a cross-sectional view similar to that on B-B in FIG. 2 of the apparatus comprising two shafts coupled together via a splined coupling according to a second embodiment of the present invention.

Apparatus according to a first embodiment of the present invention is shown in FIGS. 1A, 1B and 1C. The apparatus forms part of a gas turbine engine and includes an LP turbine shaft 2 coupled to a fan shaft 3 via a splined major coupling 1. The splined major coupling 1 is a helical splined coupling.

The turbine and fan shafts 2, 3 are each substantially tubular, having a central bore 21, 31 extending therethrough. The shafts 2, 3 each extend along a central axis (indicated by broken line 100) and are concentric about the central axis 100.

For the purposes of the following description, the turbine shaft 2 is considered to extend rearwardly from the coupling region 10, in the axial direction of the apparatus (i.e. a direction parallel to the central axis 100), and the fan shaft 3 is considered to extend forwardly from the coupling region 10, in the axial direction of the apparatus.

Figure 2:
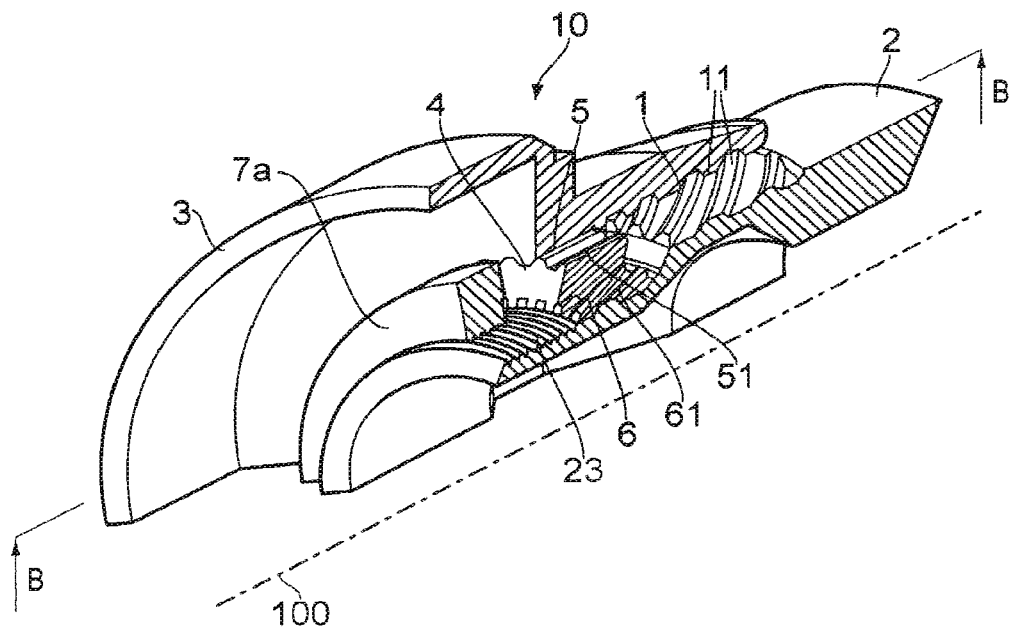
FIG. 2 shows a 3-dimensional partial cut-away view of an apparatus comprising two shafts coupled together via a splined coupling according to a first embodiment of the present invention.

At the coupling region 10, the outer surface diameter of an end region 20 of the turbine shaft 2 is smaller than an inner surface diameter of an end region 30 of the fan shaft 3. The end region 20 of the turbine shaft 2 can therefore locate within the central bore 31 at the end region 30 of the fan shaft 3. The major splined coupling is located between the inner surface 32 of the fan shaft 3 and the outer surface 22 of the turbine shaft 2, at a first portion 101 of the coupling region 10. The major coupling 1 comprises helical splines 11 (see FIG. 2), machined into the outer and inner surfaces 22, 32 of the turbine shaft 2 and the fan shaft 3 respectively, the splines 11 being interleaved with one another.

When a force is applied to the turbine shaft 2, causing it to rotate, torque is transmitted from the turbine shaft 2, through the major splined coupling 1, to the fan shaft 3, causing the fan shaft 3 to rotate at the same time as the turbine shaft 2. To reduce stress range on the major coupling 1, the apparatus comprises a means to preload the major coupling 1.

The means to preload the major coupling 1 includes a preload ring 4. The preload ring 4 is provided at a second portion 102 of the coupling region, to the front of the first portion 101. At the second portion 102, although the inner surface diameter of the fan shaft 3 is substantially the same as it is at the first portion 101, the outer surface diameter of the turbine shaft 2 is substantially smaller than it is at the first portion 101, resulting in a gap being provided between the outer surface 22 of the turbine shaft 2 and the inner surface 32 of the fan shaft 3 at the second portion 102. The preload ring 4 is received in this gap and extends around the turbine shaft 2, between the turbine shaft 2 and the fan shaft 3. At the transition between the two different inner surface diameters of the turbine shaft 2 mentioned above, the turbine shaft comprises a shoulder portion 25, the shoulder having a forward-facing surface 251. It is considered that the gap in which the preload ring 4 is received may be provided by a number of different shaft configurations.

An outer surface 41 of the preload ring 4 is coupled to the inner surface 32 of the fan shaft 3 via an axially in-line or straight-cut splined minor coupling 5 and an inner surface 42 of the preload ring is coupled to the outer surface 22 of the turbine shaft 2 via a helical splined minor coupling 6. This preferred configuration is shown schematically in FIG. 1B. An angle θ is defined between the two minor couplings 5 and 6. Splines 51a of the straight-cut splined minor coupling 5 extend parallel to the central axis 100, whereas splines 61a of the helical splined minor coupling 6 twist round the central axis 100. The splines 51a, 61a of the minor couplings 5, 6 are machined into the respective surfaces of the shafts 2, 3 and the preload ring 4. In alternative embodiments, a second helical splined minor coupling may be provided instead of the straight-cut splined minor coupling, but with splines that are straighter (i.e. twist less round the central axis 100) than the splines of the other helical splined minor coupling.

In yet a further embodiment, shown FIG. 1C, splines 51b are angled relative to the axis 100, i.e. they are helical, and splines 61B are generally parallel to the axis 100. An angle θ is defined between splines 51b, 61b. In any of these embodiments it is preferable for the angle θ to be less than the helical angle of the major splined coupling 1. The angle θ will be dependent on the degree of pre-loading required and the configuration of each particular application of the present invention.

Upon an application of a force on the preload ring 4 in the rearward axial direction, the preload ring 4 is guided by the splines 51*a*, 61*a* or 51*b*, 61*b* of the two minor couplings 5, 6, to the position shown in FIG. 1A. However, due to the differences in orientation (θ) of the splines 51*a*, 61*a* or 51*b*, 61*b*, relative to the central axis 100, as the preload ring 4 is guided rearward, the preload ring 4 is forced to twist about the central axis 100, forcing the turbine shaft 2 and the fan shaft 3 coupled on either of its sides to relatively rotate about the central axis 100. The relative rotation forces the splines 11 of the major splined coupling 1 to press against one another, thus preloading the major splined coupling 1.

To force the preload ring 4 in the rearward axial direction, in this embodiment a ring nut 7*a* is provided. The ring nut 7*a* is located to the front of the preload ring 4, at a third portion 103 of the coupling region 10. A rear surface 71 of the ring nut 7*a* bears against a front surface 43 of the preload ring 4. The ring nut 7*a* is rotatably mounted to the outer surface 22 of the turbine shaft 2 via a screw-thread 23 machined into the outer surface 22. The screw-thread 23 twists around the central axis 100 such that, upon rotation of the ring nut 7*a* about the central axis 100, the ring nut 7*a* advances in the rearward axial direction of the apparatus, whilst bearing against the preload ring 4, thus forcing the preload ring 4 in the rearward axial direction, achieving the preloading discussed above.

The rearward axial movement of the preload ring 4, and the resultant relative rotation of the turbine and fan shafts 2, 3, is limited by an axial stop 33 projecting radially inward from the fan shaft 3, to the front side of the preload ring 4, which stop 33 is arranged to engage the front surface 251 of the shoulder portion 25 of the turbine shaft 2. In more detail, since the major splined coupling is a helical splined coupling, as the preload ring 4 forces the turbine shaft 2 and the fan shaft 3 to relatively rotate, the turbine shaft and the fan shaft are also forced to move relative to each other in the axial direction. As the shafts 2, 3 move relative to each other in the axial direction, the axial stop 33 moves towards the shoulder 25. The axial stop 33 and the front surface 251 are configured to abut each other after a predetermined degree of axial movement, and therefore after a predetermined degree of relative rotation, between the turbine shaft 2 and the fan shaft 3. This enables a pre-determined amount of preloading of the major coupling 1 to be achieved.

Apparatus according to a second embodiment of the present invention is shown in FIG. 3. The apparatus is similar to the apparatus of the first embodiment except for the configuration of the ring nut 7'. As in the first embodiment, the ring nut 7' is mounted to the turbine shaft 2 via a screw-thread 23'; however, the screw-thread 23' is provided on the inner surface 24 of the turbine shaft 2, rather than the outer surface 22. So that the nut 7' can reach the front surface 43 of the preload ring 4, at the same time as contacting the inner surface 24 of the turbine shaft 2, the nut 7' is substantially L-shaped. It has a main section 71, extending in the axial direction of the apparatus and mounted to the screw-thread 23', and a flange section 72, extending radially outwards from the rear of the main section 71, toward the front surface 43 of the preload ring 4. This alternative arrangement of the nut 7' may provide a more convenient, compact, apparatus configuration.

Figure 4:
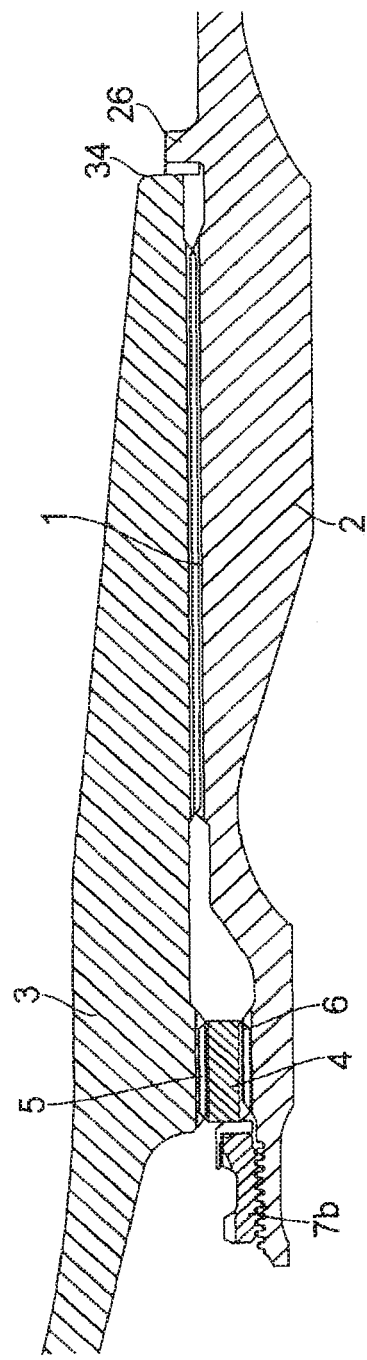
FIG. 4 shows a cross-sectional view similar to that on B-B in FIG. 2 of the apparatus comprising two shafts coupled together via a splined coupling according to a third embodiment of the present invention.

Apparatus according to a third embodiment of the present invention is shown in FIG. 4. The apparatus is similar to the apparatus of the first embodiment; however, the relative rotation and relative axial movement of the fan shaft 3 and turbine shaft 2 are limited by an axial stop 26 that projects radially outwardly from the turbine shaft 2, at the rear of the fan shaft 3. As the preload ring 4 forces the turbine shaft 2 and the fan shaft 3 to relatively rotate, the turbine shaft 2 and the fan shaft 3 are forced to move in the axial direction, relative to each other, as previously described (the fan shaft 3 moves rearward relative to the turbine shaft 2). During this relative axial movement, the rear end surface 34 of the fan shaft 3 moves toward the axial stop 26. The apparatus is configured such that the rear end surface 34 and the axial stop 26 abut each other after a predetermined degree of relative axial movement between the turbine and fan shafts 2, 3, and therefore after a predetermined degree of relative rotation between the turbine and fan shafts 2, 3. This arrangement provides an alternative approach to applying a predetermined amount of preload to the major splined coupling.

Figure 5:
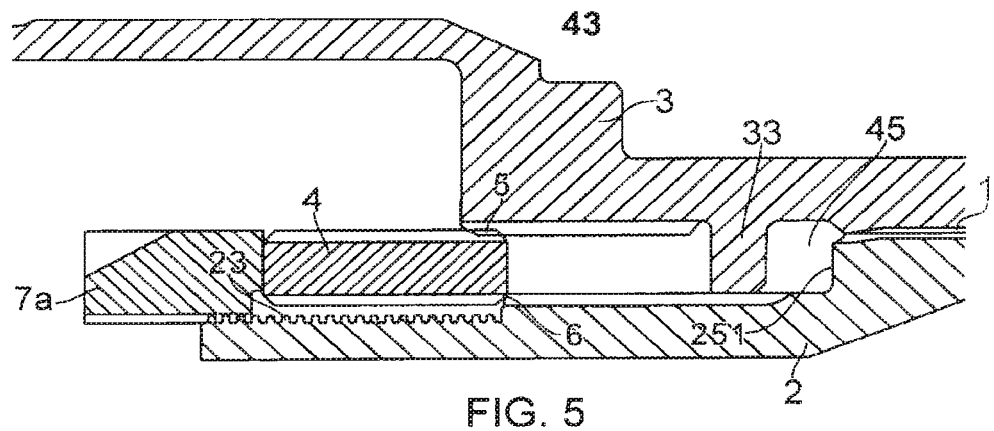
FIGS. 5 to 7 show cross-sectional views similar to that on B-B in FIG. 2 of the apparatus at different stages of a method of assembling two shafts coupled together via a splined coupling according to the present invention.
Figure 6:
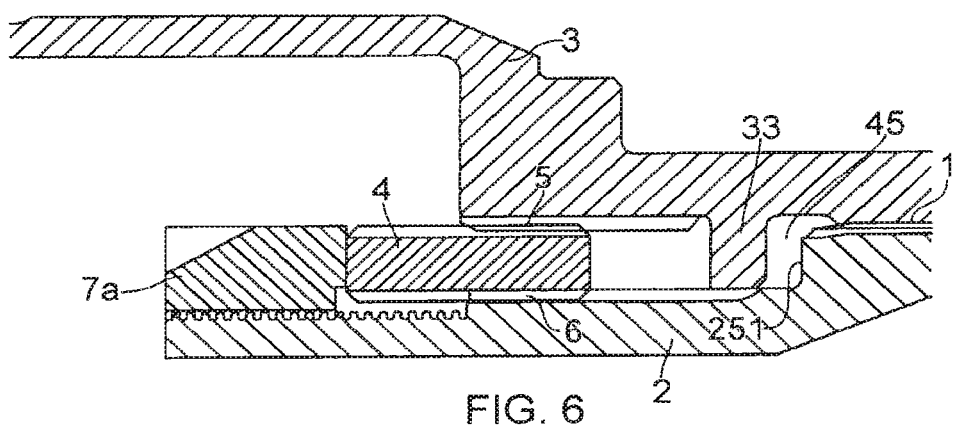
Figure 7:
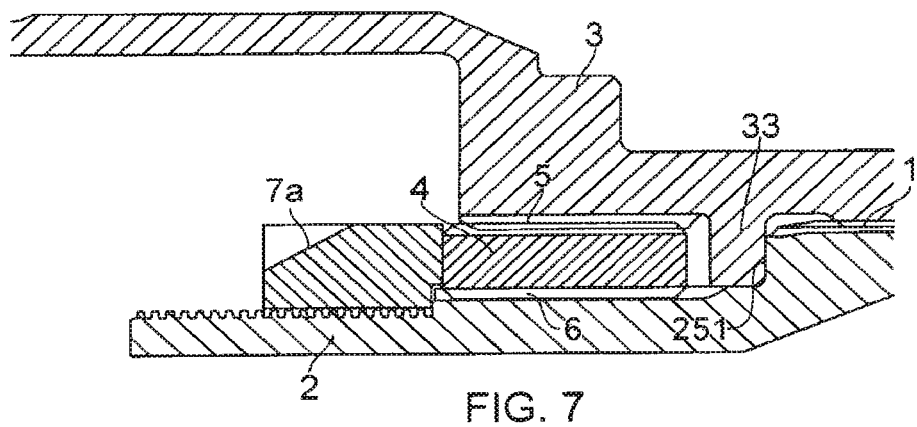

The present invention also lends itself to a method of assembling first and second coaxial shafts and which is depicted in FIGS. 5 to 7. These figures comprise the same components as shown in FIGS. 1A, 1B and 1C and therefore require no further introduction.

In FIG. 5 the shafts 2, 3 have been engaged with one another via the splined major coupling 1 through a relative axial displacement. The preload ring or torque element 4 is then presented to the shafts so that the two splined minor couplings 5 and 6 just engage the shafts' respective splines. The nut 7*a* is then screwed onto the thread 23 and rotated so that it travels towards and engages the preload ring or torque element 4. Corresponding abutments features, in the form of the axial stop 33 and the front surface 251 of the turbine shaft 2, define an axial gap 45 therebetween at this stage.

In FIG. 6, the nut 7*a* has been rotated and has travelled axially rearwardly part way along the screw thread 23 forcing the preload ring or torque element 4 along the splines 5 and 6. As the preload ring or torque element 4 is forced axially rearwardly, the two shafts 2 and 3 are rotated relatively to one another by virtue of the angle between splines 5 and 6. As can be seen the axial gap 45 has closed.

In FIG. 7, the torque element has been rotated to relatively rotate the two shafts until the axial stop 33 has contacted the front face 251. This abutment stops further relative axial movement between the two shafts 2, 3. The method of assembly, then includes further rotating the preload ring or torque element 4 to a pre-determined torque to introduce a pre-load into the splined major coupling 1.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An apparatus, comprising:
   first and second coaxial shafts, the first and second shafts extending along, and being rotatable about, a central axis,
   the first and second shafts being coupled together by a splined major coupling at a coupling region of the apparatus, the major coupling enabling the shafts to co-rotate about the central axis,
   a torque element connected to the first and second shafts via two splined minor couplings, the torque element being operable to force the first and second shafts to relatively rotate about the central axis in order to apply a predetermined preload to the major coupling, and each shaft having opposing abutment features, the opposing abutment features having axial surfaces that abut one another, thereby defining a predetermined axial position between the shafts at which the predetermined preload is applied, wherein the splined major coupling comprises a helical angle about the shafts, and wherein the two splined minor couplings are angled relative to one another, the angle between the two splined minor couplings being less than the helical angle of the major coupling.

2. The apparatus of claim 1, wherein the torque element is configured to force relative rotation of the shafts upon moving in a direction parallel to the central axis.

3. The apparatus of claim 2, wherein the torque element is configured to rotate about the central axis as it moves in the direction parallel to the central axis.

4. The apparatus of claim 1, wherein the torque element is connected to one of the first and second shafts by a helical splined minor coupling.

5. The apparatus of claim 4, wherein the torque element is connected to the other of the first and second shafts by a straight-cut splined minor coupling.

6. The apparatus of claim 1, wherein, at the coupling region:

the first shaft has a central bore providing an opening that receives the second shaft, an outer surface of the second shaft being adjacent an inner surface of the first shaft.

7. The apparatus of claim 6, wherein the major coupling is provided between the outer surface of the second shaft and the inner surface of the first shaft.

8. The apparatus of claim 6, wherein the torque element is provided between the outer surface of the second shaft and the inner surface of the first shaft.

9. The apparatus of claim 8, wherein one of the minor couplings is provided between an outer side of the torque element and the inner surface of the first shaft and the other of the minor couplings is provided between an inner side of the torque element and the outer surface of the second shaft.

10. The apparatus of claim 1, wherein the torque element is annular, with inner and outer sides.

11. The apparatus of claim 1, comprising a nut, the nut being operable to move the torque element.

12. The apparatus of claim 11, wherein the nut is rotatable about the second shaft.

13. The apparatus of claim 12, wherein the nut is engaged to the second shaft via a screw-thread and the screw-thread is provided on an outer surface of the second shaft.

14. The apparatus of claim 12, wherein the nut is engaged to the second shaft via a screw-thread, the second shaft comprises a central bore defining an inner surface of the second shaft, and the screw-thread is provided on the inner surface of the second shaft.

15. A gas turbine engine comprising the apparatus of claim 1, wherein the first shaft is a fan shaft and the second shaft is an LP turbine shaft.

16. An apparatus, comprising:

first and second coaxial shafts, the first and second shafts extending along, and being rotatable about, a central axis, the first and second shafts being coupled together by a splined major coupling at a coupling region of the apparatus, the major coupling enabling the shafts to co-rotate about the central axis, a torque element connected to the first and second shafts via two splined minor couplings, the torque element being operable to force the first and second shafts to relatively rotate about the central axis in order to apply a predetermined preload to the major coupling, and each shaft having opposing abutment features, the opposing abutment features having axial surfaces that abut one another, thereby defining a predetermined axial position between the shafts maintained throughout introduction of the predetermined preload, wherein the splined major coupling comprises a helical angle about the shafts, and wherein the two splined minor couplings are angled relative to one another, the angle between the two splined minor couplings being less than the helical angle of the major coupling.

* * * * *